JOHANNES MARINUS LODEVICUS JANSSEN
INVENTOR.

Patented Apr. 11, 1950

2,503,739

UNITED STATES PATENT OFFICE 2,503,739

CIRCUIT ARRANGEMENT PRODUCING A PHASE DISPLACEMENT HAVING A SUBSTANTIALLY CONSTANT VALUE

Johannes Marinus Lodevicus Janssen, Eindhoven, Netherlands, assignor to Hartford National Bank and Trust Company, Hartford, Conn., trustee Application January 31, 1947, Serial No. 725,460
In the Netherlands February 18, 1946

3 Claims. (Cl. 178—44)

It is often desirable, inter alia if use is made of a so-called reactance tube, to deduce an auxiliary voltage from an available alternating voltage, the former exhibiting a certain phase angle e. g. 90° with respect to the last-mentioned voltage.

Figure 1:
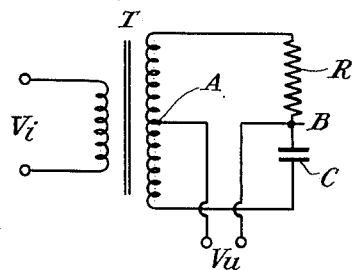
Fig. 1 shows a circuit arrangement used in explaining my invention.

A circuit arrangement commonly used for this purpose is represented in Figure 1 of the accompanying drawing.

The available voltage $Vi$ is supplied to the primary of transformer T, of which the secondary is branched at the centre A and connected to one of the two output terminals. The series-connection of a resistance R and condenser C is connected in parallel with this secondary winding. As an alternative the condenser C may be replaced by an inductance. The junction point B between R and C is connected to the other output terminal. The output voltage $Vu$ between these two terminals has a value corresponding to half the voltage across the secondary, consequently a fixed ratio relatively to $Vi$, and furthermore exhibits a phase-displacement covering an angle which depends upon the relative value of R and C and furthermore upon the frequency. If $\omega RC = 1 (\omega = 2\pi f)$ the phase angle amounts to 90°. However, this angle differs from 90° in regard to all frequencies other than $f$.

The invention provides a circuit arrangement which permits an auxiliary voltage to be deduced from an alternating voltage, the auxiliary voltage relatively to the last-mentioned voltage having not only a constant ratio in value, but also exhibiting a phase-displacement substantially independent of the frequency.

To this end, according to the invention, in a circuit-arrangement of the aforesaid kind an auxiliary resistance R in series with an auxiliary condenser C1 (as the case may be an auxiliary inductance L) is connected in parallel with the output terminals, these circuit elements having such values that $R_1 C_1 = RC$, and R1 is at least several times smaller than R.

This will be explained more fully with reference to the diagrams shown in Figs. 2, 3 and 5, Figure 4 representing a wiring diagram according to the invention.

Figure 2:
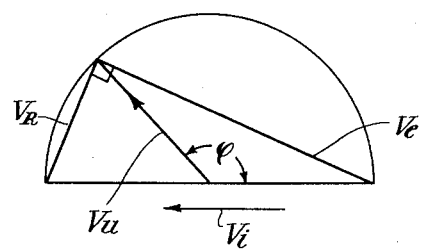
Fig. 2 is a vector diagram related to Fig. 1.

In the vector diagram shown in Fig. 2 the vectors $V_R$ and $V_C$ indicating the voltages across R and C of Fig. 1 respectively, extend normally to one another, so that their point of intersection, upon a frequency variation, moves over the circumference of a circle of which $Vi$ (voltage across the secondary transformer winding) is the diameter. Consequently, the value of vector $Vu$ is always $\frac{1}{2} V_i$, but the phase angle $\varphi$ between $Vu$ and $V_1$ is variable.

Figure 3:
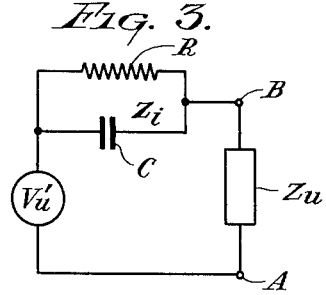
Fig. 3 is a circuit diagram used in explaining my invention.

The circuit arrangement shown in Figure 1 may be replaced by that shown in Figure 3, in which it is represented as a source of voltage $Vu'$ having an internal impedance $Z_i$ consisting of the parallel-connection of R and C. If $\omega RC = 1$, $Vu'$ is normal to $Vi$. In this case the phase angle of the internal impedance $Z_i$ amounts to $-45°$.

Upon connecting an external impedance $Zu$ between points A and B in Fig. 3, which equally has a phase angle of $-45°$, the resulting output voltage appearing between A and B amounts to $$Vu = \frac{Z_u}{Z_u + Z_i} Vu'$$

i. e. a real fraction of $Vu'$ so that it is also normal to $V_i$.

If in this circuit $\omega RC = 1$ all phase angles except that of $Vu$, which will remain 90°, change if only the phase angles of $Vu'$ and $$\frac{Z_u}{Z_u + Z_i}$$

change by opposite amounts. Upon calculation it is found that this can be ensured to a close approximation by inserting between A and B the series-connection of a resistance R1 and a condenser C1, the impedance of which series-connection is small with respect to $Zi$, and at the same time the relation should hold:

$$\omega RC = \omega R_1 C_1 = a$$

If $\omega R C_1 = b$ then $$\frac{R}{R_1} = \frac{C_1}{C} = \frac{b}{a}$$

Figure 4:
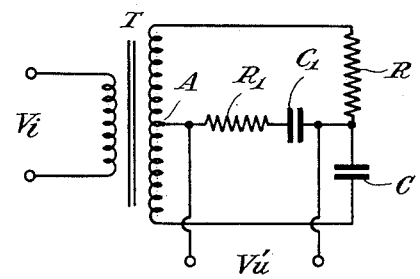
Fig. 4 shows the wiring diagram of one form of my invention.

Figure 4 represents the wiring diagram of one form of construction of the invention. This diagram corresponds to that shown in Fig. 1 and comprises in addition the series connection of a resistance R1 and a condenser C1 between points A and B.

Figure 5:
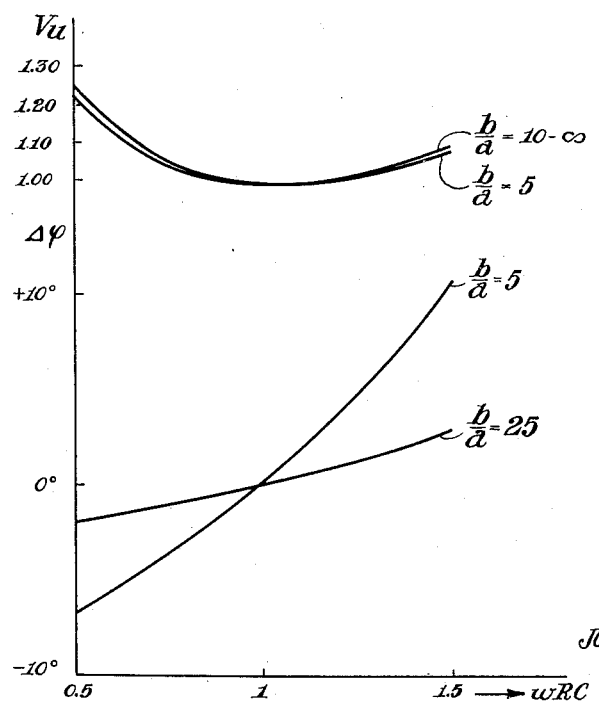
Fig. 5 shows curves illustrating the operation of Fig. 4.

Figure 5 represents several curves indicating the variation of the output voltage and of the phase displacement respectively as a function of the frequency and more particularly for several values of the ratio $b/a$. From these curves it appears that even if $$\frac{b}{a}=5$$

the phase displacement, upon a frequency variation of 50% will not change more than 10°, which will often be sufficient. The variation of the output voltage as a function of the frequency is substantially independent of the ratio $b/a$. An increase of this ratio i. e. the insertion of a smaller impedance $Z_u$ between A and B, and consequently a decrease of the available output voltage is useful only when it is of importance to make the phase displacement highly independent of the frequency.

Also for values of the phase displacement other than 90° the invention permits a satisfactory frequency-independency over a large frequency range to be obtained by making the ratio $Z_u:Z_i$ sufficiently small.

For any desired phase angle $\varphi$ the equation holds $$tg\,\varphi = \frac{\omega R C + \dfrac{1}{\omega R_1 C_1}}{1 - \dfrac{RC}{R_1 C_1}}$$

so that the phase angle $\varphi$ will be most independent of the frequency if $$\omega = \frac{1}{\sqrt{RCR_1C_1}}$$

Consequently, when it is desired to obtain a phase displacement practically independent of the frequency over a more or less wide frequency range it is necessary to satisfy the aforesaid equation, in which $\omega=2\pi$ times the average frequency over this range.

What I claim is:

1. Apparatus for deriving a phase-displaced output voltage from an alternating input voltage whose frequency is variable within a predetermined range, said apparatus comprising a transformer having a primary and a centertapped secondary, a first resistance, a first reactance connected in series with said first resistance across said secondary, output terminals connected between the centertap of said secondary and the junction of said series connected first resistance and first reactance, a second resistance, and a second reactance connected in series with said second resistance across said output terminals, said resistances and reactances having values at which the output voltage established at said output terminals has a predetermined phase displacement substantially independent of frequency within the frequency range of the input voltage.

2. Apparatus for deriving a phase-displaced output voltage from an alternating input voltage whose frequency is variable within a predetermined range, said apparatus comprising a transformer having a primary and a centertapped secondary, a resistance R, a condenser C connected in series with resistance R across said secondary, output terminals connected between the centertap of said secondary and the junction of series connected resistance R and condenser C, a resistance $R_1$, and a condenser $C_1$ connected in series with resistance $R_1$ across said output terminals, said resistances and condensers having values satisfying the expression:

$$\frac{1}{\sqrt{RCR_1C_1}}=2\pi f_a$$

where $f_a$ is the average frequency of said range and the $R:R_1$ exceeds unity by an amount at which the phase displacement of the output voltage established across the output terminals is substantially independent of frequency within the frequency range of the input voltage.

3. Apparatus for deriving a phase-displaced output voltage from an alternating input voltage whose frequency is variable within a predetermined range, said apparatus comprising a transformer having a primary and a centertapped secondary, a resistance R, an inductance L connected in series with resistance R across said secondary, output terminals connected between the centertap of said secondary and the junction of the series connected resistance R and inductance L, said resistances and inductances having values satisfying the expression:

$$\frac{1}{\sqrt{\dfrac{RR_1}{LL_1}}}=2\pi f_a$$

where $f_a$ is the average frequency of said range and the ratio $R:R_1$ exceeds unity by an an amount at which the phase displacement of the output voltage established across the output terminals is substantially independent of frequency within the frequency range of the input voltage.

JOHANNES MARINUS
LODEVICUS JANSSEN.

No references cited.